(12) United States Patent
Balton et al.

(10) Patent No.: US 11,618,291 B2
(45) Date of Patent: Apr. 4, 2023

(54) POWERLINE COMMUNICATION CONTROLLER FOR COMMUNICATIONS BETWEEN A VEHICLE AND A TRAILER

(71) Applicant: PACCAR Inc, Bellevue, WA (US)

(72) Inventors: Christopher S. Balton, Bellingham, WA (US); Charles Wayne Reinhardt Swart, Bellingham, WA (US); Stephen David Paul, Oak Harbor, WA (US); Tracy Dylan Powell, La Conner, WA (US); Wayne M. Winch, Stanwood, WA (US)

(73) Assignee: Paccar Inc, Bellevue, WA (US)

( * ) Notice: Subject to any disclaimer, the term of this patent is extended or adjusted under 35 U.S.C. 154(b) by 485 days.

(21) Appl. No.: 16/773,762

(22) Filed: Jan. 27, 2020

(65) Prior Publication Data

US 2021/0229510 A1 Jul. 29, 2021

(51) Int. Cl.
*B60D 1/62* (2006.01)
*B62D 13/06* (2006.01)
*H04N 7/18* (2006.01)

(52) U.S. Cl.
CPC .............. *B60D 1/62* (2013.01); *B62D 13/06* (2013.01); *H04N 7/183* (2013.01); *B60R 2300/408* (2013.01); *B60R 2300/8066* (2013.01)

(58) Field of Classification Search
CPC .......... B60D 1/62; B62D 13/06; H04N 7/183; B60R 2300/408; B60R 2300/8066; H04B 2203/547; H04B 3/548
See application file for complete search history.

(56) References Cited

U.S. PATENT DOCUMENTS

| 2016/0052453 | A1 | 2/2016 | Nalepka et al. |
| 2017/0240125 | A1 | 8/2017 | Weigert et al. |
| 2019/0084534 | A1* | 3/2019 | Kasper ................. B60T 8/1708 |
| 2020/0338941 | A1* | 10/2020 | Slade .................... B62D 63/08 |

OTHER PUBLICATIONS

European Search Report, dated May 20, 2021, for International Patent Application No. EP 21 15 1320. (7 pages).

* cited by examiner

*Primary Examiner* — James M Pontius
(74) *Attorney, Agent, or Firm* — Seed Intellectual Property Law Group LLP

(57) ABSTRACT

A communication interface that facilitates communications over powerlines between a trailer and a vehicle. The communication interface includes a housing having first contact and a second contact accessible from an exterior of the housing. The first contact is electrically coupled to the second contact via a powerline that connects an electrical system of the vehicle with an electrical system of the trailer. The communication interface includes a powerline communication controller having a first set of terminals coupled to a first connector and a second set of terminals coupled to the powerline. The powerline communication controller is configured to receive a first signal from a device of the trailer that indicates a condition regarding a defined region of the trailer. The powerline communication controller is configured to generate, based on the first signal, a second signal representative of the condition, and introduce the second signal onto the first power signal.

20 Claims, 9 Drawing Sheets

POWERLINE COMMUNICATION CONTROLLER FOR COMMUNICATIONS BETWEEN A VEHICLE AND A TRAILER

BACKGROUND

Technical Field

The present disclosure relates to communication interfaces and, more particularly, communication interfaces for communications between physically connected vehicles and trailers.

Description of the Related Art

Although tractor trailers spend a majority of their operation travelling forward, a disproportionate percentage of accidents occur when tractor trailers are traveling in reverse. The National Safety Council estimates that, despite the fact most tractor trailer drivers travel less than two miles per year in reverse, as many of 25% of accidents involving tractor trailers occur when the tractor trailers are traveling in reverse. The average cost of a typical backing accident is thousands of dollars, which represents a significant cost to both truckers and insurance companies. Equipping trucks to warn truckers regarding a potential collision when travelling in reverse is difficult due to the amount of space occupied by such equipment and due to blind spots a driver would encounter even with such equipment.

Equipping trailers to detect and warn drivers regarding potential collisions when a tractor trailer is travelling in reverse has also been challenging due to the cost and complexity of such upgrades. Even if a trailer is equipped to warn a driver regarding a potential accident when a truck is maneuvering the trailer in reverse, the truck would need modifications to facilitate such communications. Certain authorities, such as the society of automotive engineers, promulgate standards to provide uniformity in the trucking industry for such upgrades, but have not provided standards sufficient to lead to the widespread adoption of such equipment in tractor trailer systems. In the absence of such standards, truck owners and operators may be reluctant to implement costly upgrades to their trucks. Existing connectors for connection between tractors and trailers are insufficient to communicate the types and amounts of data between the tractor and trailer for warning about potential collisions while maneuvering the tractor trailer in reverse or on a road.

BRIEF SUMMARY

Briefly stated, embodiments disclosed herein are directed to devices, systems, and methods for facilitating communications between a trailer or multiple trailers and a vehicle towing the trailer via one or more powerlines. Components, such as sensors and/or devices, may be positioned in or on the trailer and electrically communicatively coupled to a processor-based communication interface on the trailer. The communication interface includes a first contact and a second contact electrically coupled to the first contact by a first electrical wire in the communication interface. A first power signal of an electrical system of the vehicle may be coupled to the first contact and an electrical system of the trailer may be coupled to the second contact to connect the electrical systems and provide power to the electrical systems of the trailer.

The communication interface of the trailer includes a powerline communication controller that has a first terminal coupled to the first electrical wire. The communication interface includes a device interface having ports for connecting components on the trailer to the communication interface. The powerline communication controller is configured to receive first signals from one or more sensors regarding conditions detected in defined regions in and around the trailer. The powerline communication controller may generate second signals representative of the conditions detected and introduce the second signals onto the first electrical wire. A powerline communication controller of the vehicle may obtain the second signals from the first power signal and process the second signals to determine the conditions detected by the sensors.

The communication interface of the trailer may, in some embodiments, include a second electrical wire coupling a third contact and a fourth contact to provide a second power signal between the electrical systems of the vehicle and the trailer. The powerline communication controller of the vehicle may introduce a communication signal on the second power signal, which is conveyed onto the second electrical wire. The communication signal may indicate operations to be performed by the components on the trailer, or may indicate operations performed by or on the vehicle. The powerline communication controller in the communication interface of the trailer obtains the communication signal from the second power signal and controls one or more of the components based on the communication signal.

DETAILED DESCRIPTION

Figure 1:
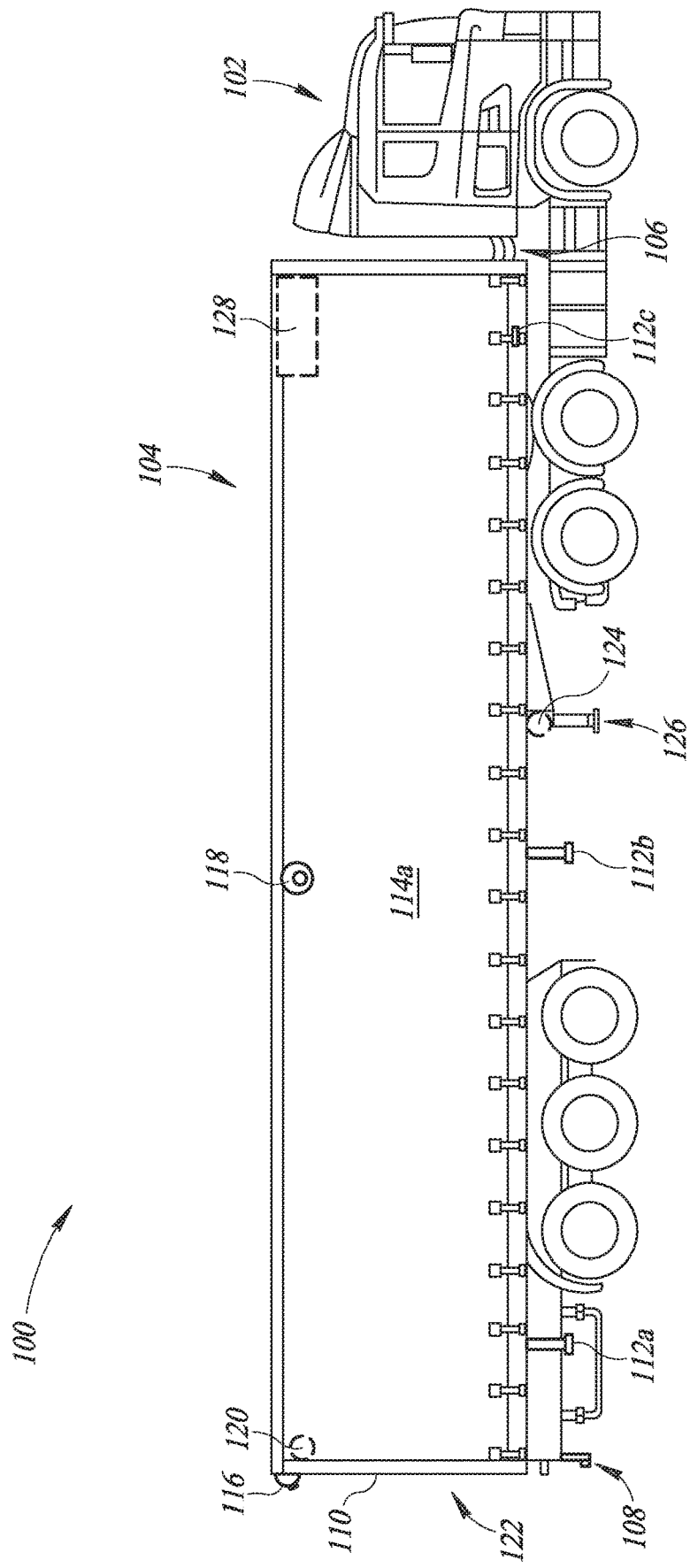
FIG. 1 is a side view of a tractor trailer according to one or more embodiments.

FIG. 1 shows a side view of a tractor trailer 100 equipped for communication of data between a connector of a tractor 102 and a connector of a trailer 104 according to one or more embodiments. The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

As used herein, the term "tractor trailer" refers to a vehicle ("tractor") having another vehicle ("trailer") in tow, and therefore includes medium- or heavy-duty trucks, tractor trucks, semi-trailer trucks, and tractor truck/trailer combinations having a further vehicle or further vehicles in tow. Although the term "tractor" is used herein, the present disclosure is not limited to medium-duty and heavy-duty trucks for commercial trucking. The present disclosure may be applicable to vehicles equipped for towing recreational vehicles or trailers for hauling mobile cargo, such as boats and cars.

The trailer 104 includes a plurality of sensors positioned to detect conditions in regions in and/or around the trailer 104. The plurality of sensors are electrically communicatively coupled to electrical systems of the tractor 102 via a connection 106 between the tractor 102 and the trailer 104. The connection 106 is a physical and electrical connection between the tractor 102 and the trailer 104 over which electrical power generated by the tractor 102 may be provided to the trailer 104 for powering electrical systems and components thereof. As described herein, the connection 106 may include a connector on the tractor 102, a connector on the trailer 104, and a selectively attachable and removable cable or cord providing a set of electrical connections between the connectors. According to one or more embodiments of the present disclosure, a powerline communication controller is provided in at least one of the tractor 102 and the trailer 104.

Signals generated by the sensors are received and processed by the powerline communication controller installed on the trailer 104. The powerline communication controller generates a signals corresponding to the received sensor signals and transmits the signals generated to an electrical system of the tractor 102 over the connection 106. The powerline communication controller is electrically coupled to a set of powerlines in the connection 106 that provide power generated by the tractor 102 to electrical systems in the trailer 104. The signals corresponding to the sensor signals provided by the sensors are transmitted on one or more of the set of powerlines by the powerline communication controller.

The plurality of sensors may include a set of proximity sensors that detect the presence of objects in defined regions around the trailer 104. The set of proximity sensors may include one or more rear proximity sensors 108 positioned to detect the proximity of objects to a rear side 110 of the trailer 104. The set of proximity sensors may include one or more lateral proximity sensors 112a, 112b, 112c, etc., (collectively proximity sensors 112) positioned to detect the proximity of objects to a lateral side 114a of the trailer 104. The phrase "proximity sensor" refers to a class of sensors that generate a signal corresponding to the physical proximity of an object based on various non-contact physical phenomena. Non-limiting examples of proximity sensors include laser rangefinders, radar, sonar, ultrasonic sensors, LIDAR, and Doppler Effect sensors.

The set of sensors may also include a set of one or more cameras positioned to capture images in regions around the trailer 104. One or more rear cameras 116, for instance, may be positioned and oriented to capture images of a region around the rear side 110 of the trailer 104. One or more side cameras 118 may be positioned and oriented to capture images in regions around the lateral side 114a of the trailer 104. In general, the term "camera" refers to an optical sensor that generates an electric signal corresponding to characteristics of light incident upon the optical sensor, such as digital cameras (e.g., CMOS sensors, CCD sensors) and cameras that capture images in spectrums invisible to the human eye (e.g., infrared sensors, ultraviolet sensors).

Other types of sensors may be included in the plurality of sensors to detect conditions in, around, and associated with the trailer 104. Non-limiting examples of such sensors include temperature sensors, pressure sensors, audio sensors, anemometers, humidity sensors, and accelerometers. For example, temperature sensors may measure the temperature of refrigerated compartments in the trailer 104; anemometers may be implemented to measure air resistance associated with movement of the trailer 104; audio sensors may detect the presence of certain events (e.g., sirens, tire wear and flats, conditions indicating potential brake failure); and accelerometers may measure vibration of the trailer 104. Sensors may be included for detecting other conditions associated with the state of the trailer 104, such as door sensors that detect a state of the door 122, or slide axle sensors that detect a state of a slide axle.

The trailer 104, in some embodiments, includes or has attached thereto a set of devices that are configured to perform various operations involving aspects of the trailer 104. The set of devices may be electrically communicatively coupled to the powerline communication controller described herein, which controls operation of the set of devices based on signals conveyed over the connection 106. The set of devices may include one or more devices that actuate a corresponding portion of the trailer 104. For example, a first motor 120 may be coupled to a door 122 of the trailer 104 and configured to automatically and selectively open and/or close the door 122 as a result of communications received by the powerline communication controller. A second motor 124 may be coupled to landing gear 126 provided on an underside of the trailer 104 for selectively transitioning the landing gear 126 between a supporting state in which the trailer 104 is supported by the landing gear 126 and a stowed state in which the trailer 104 is supported by the truck 102. An air conditioning or refrigeration unit 128 may be included in the trailer 104 to control environmental conditions (e.g., temperature, moisture) in an inner compartment (not shown) of the trailer 104.

Other devices may be included in the trailer 104 that are operably controlled by the powerline communication controller. For instance, one or more of the cameras 116 and 118 may include or have associated therewith motors for controlling an orientation of the camera to change a region captured by the camera. The powerline communication controller may also adjust settings of the cameras, such as focus, aperture, shutter speed, and mode (e.g., night vision mode, motion detection, object detection), by way of non-limiting example. The operable devices may include controllers that receive communications from the powerline communication controller and control operation of the devices by, e.g., sending a control signal to a corresponding motor of the device. The powerline communication controller may control operation of the devices of the trailer 104 based on communications received from the tractor 102.

In some implementations, the powerline communication controller may receive signals from the tractor 102 specifying operations to be performed by specific devices of the trailer 104. In some implementations, the powerline communication controller may receive signals from the tractor 102 indicating a state of the tractor 102 or an operation performed by the tractor 102. The powerline communication controller may be configured to control one or more devices of the trailer 104 based on the state or operation of the tractor 102 indicated by the signals received.

Figure 2:
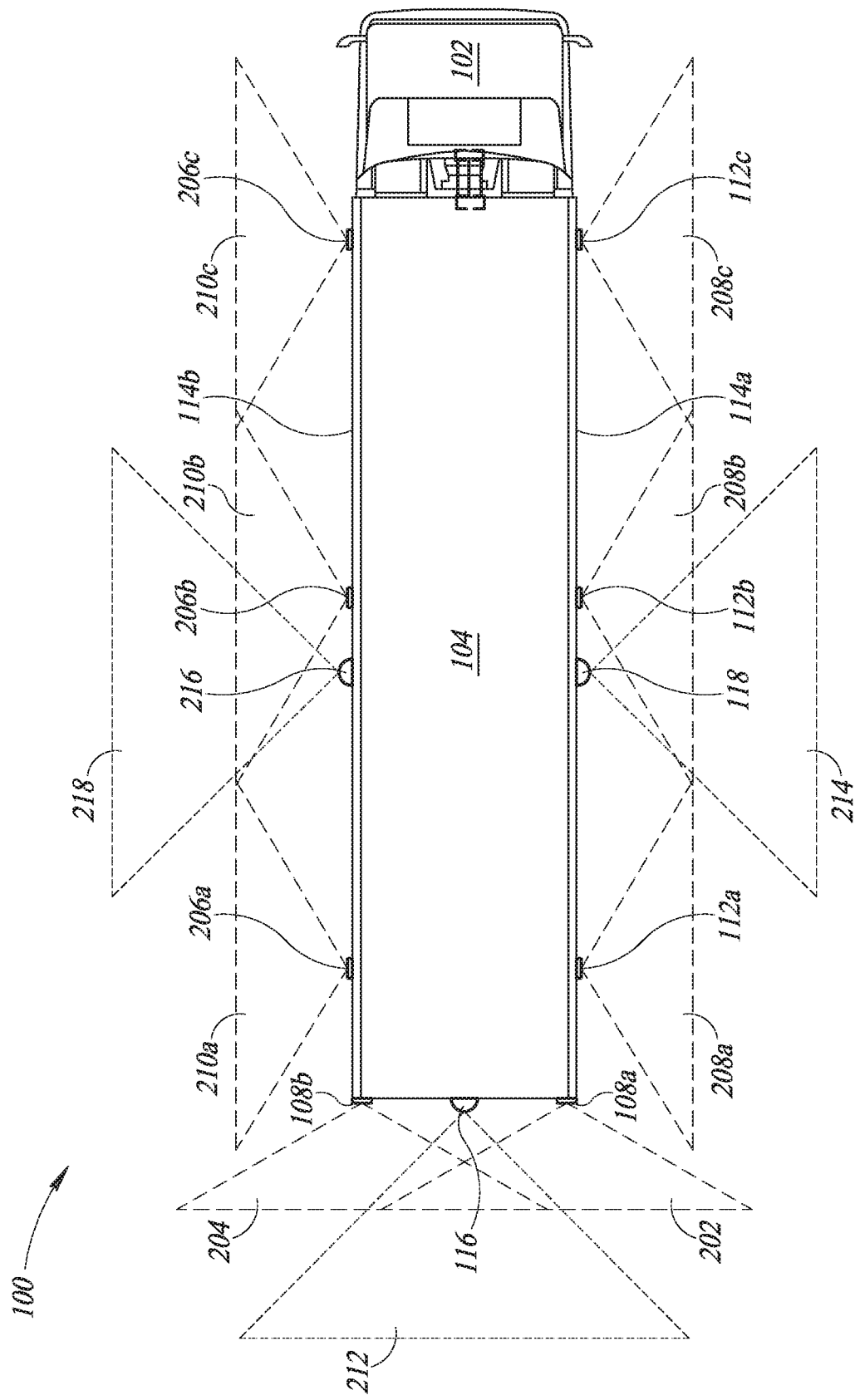
FIG. 2 is an overhead view of the tractor trailer of FIG. 1.

FIG. 2 shows an overhead view of the tractor trailer 100 in which sensors detect conditions in one or more detection regions according to one or more embodiments. A first rear proximity sensor 108a positioned toward a first lateral side 114a on the rear side 110 of the trailer 104 has a detection region 202 and a second rear proximity sensor 108b positioned toward a second lateral side 114b on the rear side 110 has a detection region 204. The powerline communication controller is coupled to receive signals from the rear proximity sensors 108a and 108b indicating the proximity of objects in the detection regions 202 and 204.

A set of lateral proximity sensors 206a, 206b, 206c, etc., (collectively proximity sensors 206) is positioned to detect the proximity of objects to the second lateral side 114b opposite to the first lateral side 114a. Each of the lateral proximity sensors has a corresponding detection region for detecting the proximity of objects around lateral sides 114a and 114b of the trailer 104. The set of lateral proximity sensors 112a, 112b, and 112c detect the proximity of objects in corresponding detection regions 208a, 208b, and 208c to the first lateral side 114a of the trailer 104. The set of lateral proximity sensors 206a, 206b, and 206c detect the proximity of objects in corresponding regions 210a, 210b, and 210c to the second lateral side 114b of the trailer 104. The powerline communication controller is coupled and configured to receive signals from the sets of lateral proximity sensors 112 and 206 indicating the proximity of objects to the first lateral side 114a and/or the second lateral side 114b. The signals received may indicate the presence of an object in the detection region and, in some embodiments, may indicate a distance of the object from the respective proximity sensor. The powerline communication controller of the trailer 104 may process the information from the proximity sensors and send corresponding data to a system of the tractor 102.

Cameras may also be positioned at various locations on the trailer 104 to capture images of regions around the trailer 104. The rear camera 116 is positioned and oriented to capture images of a region 212 around the rear side 110 of the trailer 104. The one or more side cameras 118 are located on or around the first lateral side 114a of the trailer 104. The one or more side cameras 118 are positioned and oriented to capture images of one or more corresponding regions 214 around the first lateral side 114a of the trailer 104. One or more side cameras 216 may be located on or around the second lateral side 114b of the trailer. The one or more side cameras 216 may be positioned and oriented to capture images of one or more corresponding region 218 around the second lateral side 114b of the trailer 104.

Each of the rear camera(s) 116, the side camera(s) 118, and the side camera(s) 216 may be independently operable to move to adjust their respective views. The rear camera(s) 116, the side camera(s) 118, and the side camera(s) 216 observe conditions in their respective observed regions and may be configured to identify the presence of certain objects in their regions—for instance, the cameras may be configured to recognize the presence of a human or a car in regions around the trailer 104 and send information to the powerline communication controller indicating the type and presence of the object detected. The powerline communication controller may receive and process images captured from the cameras 116, 118, 216, and send information to a system of the tractor 102 based on the processed images.

Figure 3:
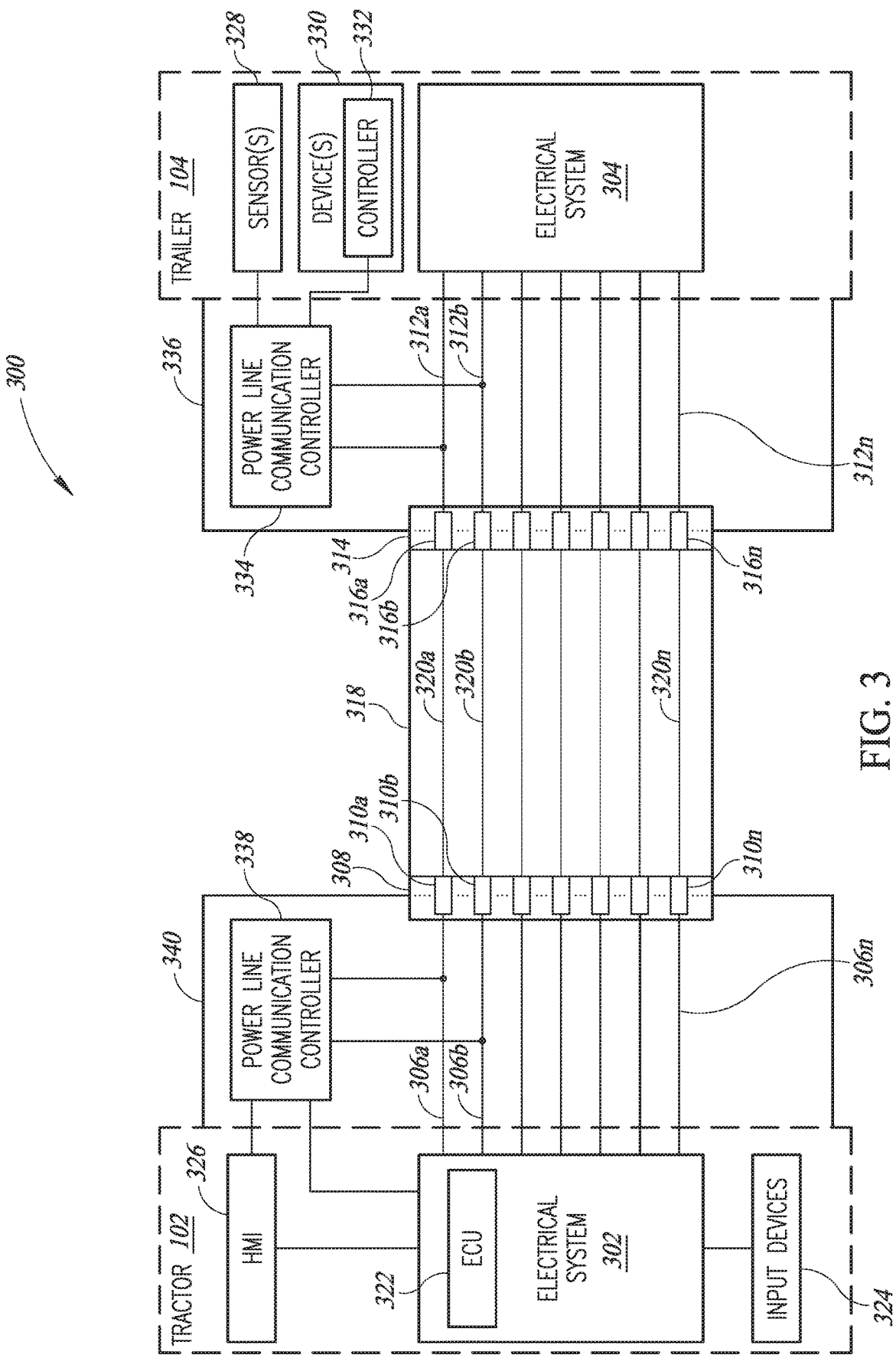
FIG. 3 is a schematic diagram of interconnected powerline communication controllers of the tractor trailer of FIG. 1.

FIG. 3 shows a connection system 300 in which electrical power is provided by the tractor 102 to the trailer 104 according to one or more embodiments herein. The connection system 300 comprises the connection 106 described above with respect to FIG. 1 and elsewhere herein. The tractor 102 includes an electrical system 302 that provides electrical power to an electrical system 304 of the trailer 104 when the tractor 102 is in operation (e.g., ignition switch in the accessory position, engine is running).

A plurality of electrical lines 306a, 306b, . . . , 306n connect the electrical system 302 of the tractor 102 to a plurality of electrical contacts 310a, 310b, . . . , 310n of a connector 308, which is installed on the tractor 102 and accessible from an exterior of the tractor 102. A plurality of electrical lines 312a, 312b, . . . , 312n connect the electrical system 304 of the trailer 104 to a plurality of contacts 316a, 316b, . . . , 316n of a connector 314, which is installed on the trailer 104 and accessible from an exterior of the trailer 104. A cable 318 has a first end physically and electrically coupled to the connector 308 of the tractor 102 and a second end physically and electrically coupled to the connector 314 of the trailer 104. The cable 318 includes a plurality of conductors (e.g., wires) 320a, 320b, . . . , 320n that electrically couple the contacts 310a, 310b, . . . , 310n of the tractor 102 to corresponding contacts 316a, 316b, . . . , 316n of the trailer 104 to create a plurality of electrically conductive paths between the electrical system 302 and the electrical system 304.

In some embodiments, the number n of the electrical lines 306, the number n of the electrical contacts 310, the number n of contacts 316, the number n of the conductors 320, and the number n of electrical lines 312 may not all be the same. For example, the number of electrical lines 306, the number of electrical contacts 310, the number of conductors 320, and the number of contacts 316 may be fewer than the number of electrical lines 312 in the trailer 104. A pair of electrical lines 306a and 306b, a pair of electrical contacts 310a and 310b, a pair of conductors 320a and 320b, and a pair of contacts 316a and 316b may provide power signals (e.g., +12 VDC, 0 VDC) to the trailer 104 The power signals are distributed among a number of electrical lines 312 that are greater in number than two.

The electrical system 304 of the trailer 104 may include a variety of devices that, as a result of receiving electrical power from the electrical system 302, are operable to perform various functions. The electrical system 304 may, for example, include a lighting subsystem that includes circuits for turn signal lights, brake lights, identification lamps, and tail lights. The electrical system 302 may not provide continuous power to at least some circuits in the lighting subsystem, such as the turn signal lights; however, some circuits in the lighting subsystem may be provided with continuous power. Some of the electrical lines 306, the electrical lines 312, and the wires 320 may be dedicated to providing electrical power to the lighting subsystem.

The electrical system 304 may also include one or more auxiliary circuits, such as an anti-lock brake (ABS) system, that are provided with continuous power from the electrical system 302. The electrical system 302 typically provides the one or more auxiliary circuits with continuous power. For instance, when the tractor 102 is in operation, the electrical system 302 may continuously provide a first power signal on a first electrical line 306a, the first power signal being conducted over the wire 320a and the electrical line 312a to one or more auxiliary circuits of the electrical system 304. The first power signal may be a direct current (DC) power signal in some embodiments—for example, a +12 VDC power signal. The electrical system 304 may also continuously provide a second power signal on a second electrical line 306b, the second power signal being conducted over the wire 320b and the electrical line 312b to one or more circuits of the electrical system 304. In some embodiments, the second power signal may be a power signal return or ground for the DC power signal provided on the first electrical line 306a. In some embodiments, the second power signal may be a second DC power signal having the same amplitude or different amplitude than the first power signal.

The connectors 308 and 314 may be configured according to one or more industry or government standards, such as SAE standards or International Organization for Standardization (ISO) standards. For example, the connectors 308 and 314 may be have a 7-pin connector established according to SAE standards J-560 or J-1067, or ISO standard 1185, by way of non-limiting example. However, other standards may be applicable based on the desired application and vehicle and/or trailer type.

The tractor 102 includes an electronic control unit (ECU) 322 that controls operational aspects of the tractor 102, such as control of turn signals, braking (ABS), and engine operation (e.g., fuel injection). The ECU 322 may also obtain information from devices of the tractor 102 indicating operational aspects of the tractor 102, such as vehicle speed, turning events (e.g., turn signal activation, rotational angle of the steering wheel), braking events, acceleration, etc. The tractor 102 also includes a plurality of input devices 324 for receiving input from a user to drive and operate the tractor 102. Non-limiting examples of such input devices 324 include a steering wheel, gas and brake pedals, turn signal switches, a cruise control interface, headlight switches, and windshield wiper switches. The ECU 322 receives input provided via the input devices 324 and generates signals for controlling operational aspects of the tractor 102 in response.

The tractor 102 may also include a human machine interface (HMI) 326 that includes a user interface facilitating user interaction with the tractor 102. The HMI 326 includes a display device for displaying information regarding operation of the tractor 102, and may display information associated with the trailer 104 provided by a powerline communication controller. Such information associated with the trailer 104 may be received via the connector 308, the cable 318, and the connector 314. The HMI 326 may also include one or more input devices for receiving user input to control aspects of the tractor 102 and/or the trailer 104. The one or more input devices may include a control panel including one or more buttons, switches, dials, etc., and may include a touchscreen display panel that a user may interact with to provide the user input.

The trailer 104 includes a set of sensors 328 for detecting conditions in regions in and around the trailer 104. Non-limiting examples of sensor types that may be included among the set of sensors 328 are proximity sensors, cameras, accelerometers, and/or gyroscopes. The trailer 104 may include a set of devices 330 are configured to perform various operations involving aspects of the trailer 104. Non-limiting examples of device types that may be included among the set of devices 330 are motors, actuators, and refrigeration devices described herein. Some of the set of devices 330 may include a controller 332 that receives signals (e.g., control signals, instructions) for controlling operation of a corresponding device.

The trailer 104 is equipped with a powerline communication controller 334 that is configured to communicate with a system of the tractor 102. In at least some embodiments, the powerline communication controller 334 communicates with the system of the tractor 102 over one or more of the electrical lines 312. For example, the powerline communication controller 334 may be configured to communicate over one or more of the electrical lines 312 that convey power signals between the tractor 102 and the trailer 104. The power line communication controller 334 shown in FIG. 3 has a first terminal coupled to the electrical line 312a that conveys a first power signal between the tractor 102 and the trailer 104, and has a second terminal coupled to the electrical line 312b that conveys a second power signal between the tractor 102 and the trailer 104.

The powerline communication controller 334 is electrically communicatively coupled to the set of sensors 328 for receiving signals dictating conditions detected in and around the trailer 104. The powerline communication controller 334 is also electrically communicatively coupled to the set of devices 330 and configured to send signals to the set of devices 330 to control operations thereof. The powerline communication controller 334 may be configured to introduce signals conveying information regarding the conditions detected onto a power signal on the electrical lines 312. The powerline communication controller 334 may be configured to obtain signals from a power signal on the electrical lines 312 that indicate an operation to be performed by the set of devices 330 or that indicate an operation performed by the tractor 102.

The powerline communication controller 334 is contained within a housing 336 that is physically coupled to or integrated with the trailer 104. The housing 336, for example, may be a ruggedized casing that protects the powerline communication controller 334 from potentially damaging environmental conditions, such as moisture, snow, rain, ice, impact from rock and debris, corrosion, salt, and high and low temperature conditions (e.g., below 32° F., above 100° F.). In some embodiments, the housing 336 and the connector 314 may be a single, integral unit that collectively forms a socket installed on an exterior of the trailer 104, and the socket may contain the powerline communication controller 334 therein. In some embodiments, the housing 336 may be a separate ruggedized container housing the powerline communication controller 334, and the housing 336 may be physically separate from the connector 314 installed on an exterior of the trailer 104.

The tractor 102 also includes a powerline communication controller 338 that is configured to communicate with the trailer 104 via one or more of the electrical lines 312 that convey power line signals between the tractor 102 and the trailer 104. The powerline communication controller 338 may have a similar configuration to the powerline communication controller 334 described herein. In some embodiments, however, the powerline communication controller 338 may be connected differently than the powerline communication controller 334. For instance, a first terminal of the powerline communication controller 334 may introduce communication signals onto a first power signal on the electric wire 312a, and a second terminal of the powerline communication controller 338 may obtain the communication signals from the first power signal on the electric wire 306a. Conversely, a first terminal of the powerline communication controller 338 may introduce communication signals onto a second power signal on the electric wire 312b, and a second terminal of the powerline communication controller 334 may obtain the communication signals from the second power signal on the electric wire 306b. In some implementations, multiple terminals of one of the powerline communication controllers 334 and 338 may introduce communication signals on multiple power signals in a given time period, and multiple terminals of the other one of the powerline communication controllers 334 and 338 may obtain the communication signals from the multiple power signals in the given time period.

In some embodiments, the powerline communication controller 334 and/or the powerline communication controller 338 may include a wireless communication interface for wireless communications. A wireless communication interface of the powerline communication controller 334, for example, may facilitate wireless communication with one or more of the set of sensors 328 and/or one or more of the set of devices 330. A wireless communication interface of the powerline communication controller 338 may facilitate wireless communication with the ECU 322 and/or with the HMI 326. In some embodiments, a wireless communication interface of the powerline communication controller 334 and a wireless communication interface of the powerline communication controller 338 may communicate with each other over a wireless communication channel in addition to the communications over the wired connection provided by the cable 318.

The powerline communication controller 338 is communicatively electrically coupled with the ECU 322 of the tractor 102 and configured to receive information from the ECU 322 regarding operation of the tractor 102. For instance, the powerline communication controller 338 may receive signals indicating steering of the tractor 102, turn signals activated or deactivated in the tractor 102, transmission events (e.g., shifting into reverse), or other such information. The powerline communication controller 338 may be electrically communicatively coupled with the HMI 326 to receive instructions from the HMI 326 regarding operations to be performed by the devices 330 of the trailer 104. The powerline communication controller 338 may also send signals to the HMI 326 regarding conditions detected in and around the trailer 104 by the sensors 328.

The powerline communication controller 338 is contained within a housing 340 that is physically coupled to or integrated with the tractor 102. In some embodiments, the housing 340 and the connector 308 may collectively form a socket installed on an exterior of the tractor 102, and the socket may contain the powerline communication controller 338 therein. In some embodiments, the housing 340 may be a module containing the powerline communication controller 338 and that is physically separate from the connector 308 installed on an exterior of the tractor 102.

Figure 4:
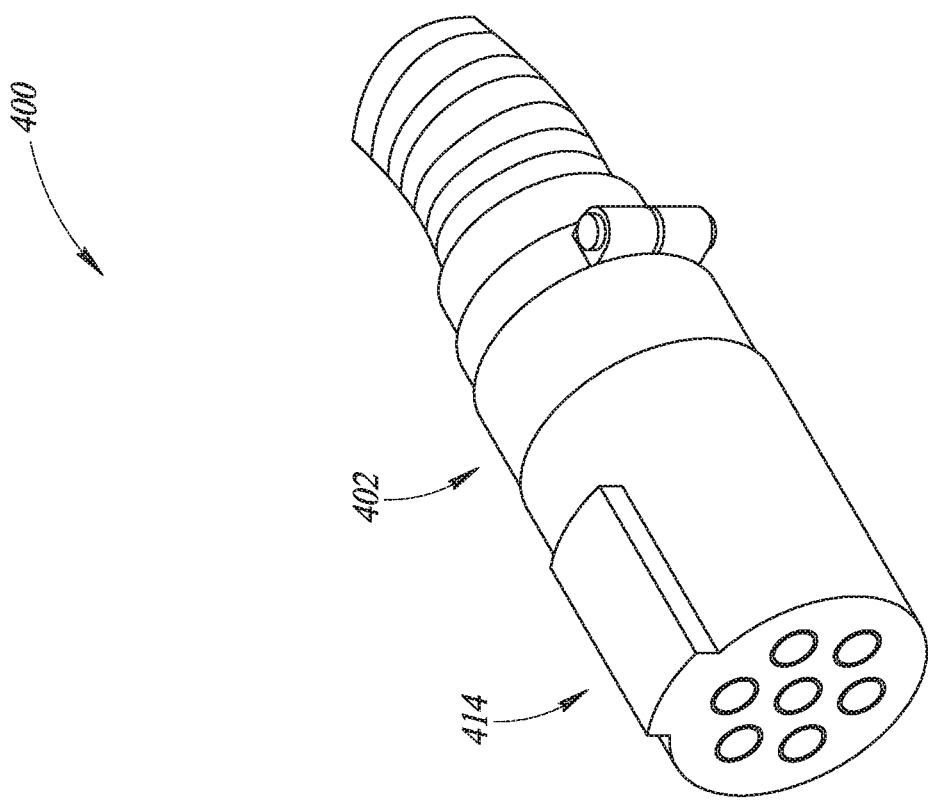
FIG. 4 is a perspective view of a connector assembly and a corresponding cable for engaging with the connector assembly according to one or more embodiments.
Figure 4:
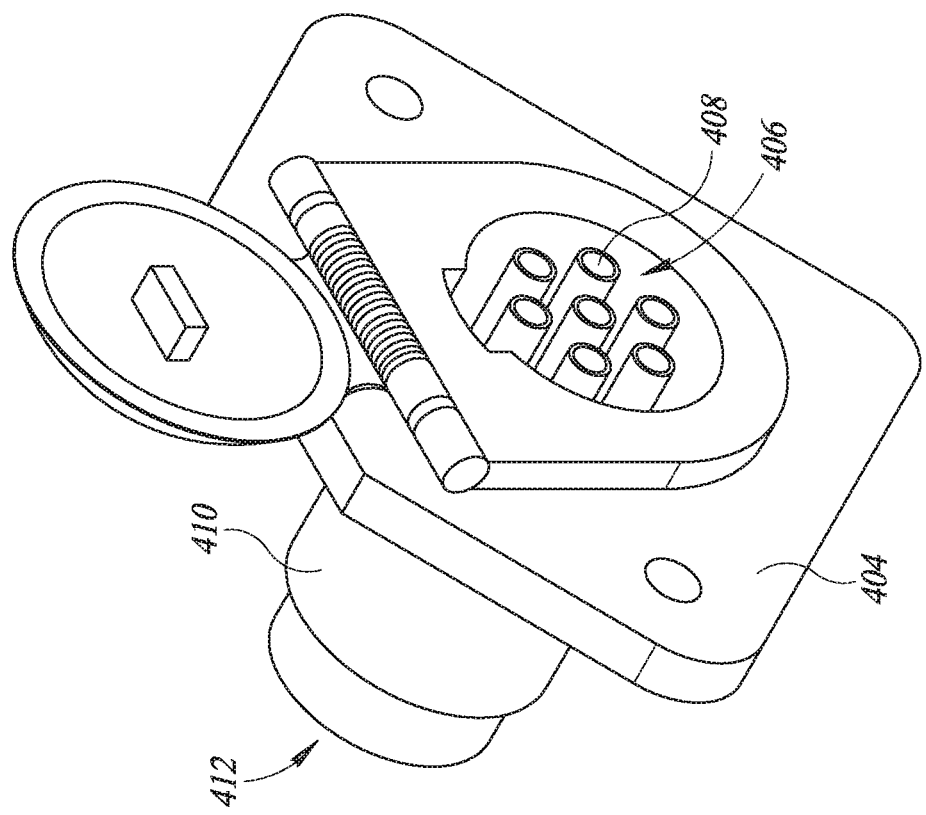

FIG. 4 shows a socket 400 and cable 402 for establishing the connection 106 between the tractor 102 and the trailer 104 according to one or more embodiments. The exterior of the socket 400 is comprised of a rugged weather-resistant material such as aluminum or nylon that may be die-cast into a desired form. The socket 400 includes a faceplate 404 configured for attachment to an exterior surface of the truck 102 or of the trailer 104. The socket 400 further includes a connector portion 406 corresponding to the connectors 308 and 314 described herein. The connector portion 406 includes a plurality of contacts 408 corresponding to the contacts 310 or the contacts 316 also described herein. The connector portion 406 shown has a recessed portion in which the contacts 408 are located.

The socket 400 further includes a body portion 410 extending in a rearward direction from the faceplate 404 and the connector portion 406. The socket 400 also includes a second connector portion 412 having contacts (not shown) for conveying electrical signals to and from the electrical system of the tractor 102 or of the trailer 104. The body portion 410 may contain conductors for conveying electrical signals between the contacts 408 of the connector portion 406 and contacts of the second connector portion 412. Each of the tractor 102 and the trailer 104 has a socket 400 installed on an exterior thereof. In particular, the tractor 102 has a socket 400 installed on a rearward facing surface of a cab and the trailer 104 has a socket 400 installed on a forward facing surface of the trailer body. The cable 402 includes a plug 414 located at each end of the cable for engaging with the connector portion 406. The cable 402 corresponds to the cable 318 described herein. The cable 402 is a cable configured to provide power from the electrical system 302 of the truck 102 to the electrical system 304 of the trailer 104. The socket 400 and the cable 402 conform to one or more industry or government standards, such as the SAE standards (e.g., J-560, J-1067) and/or ISO standards.

Figure 5:
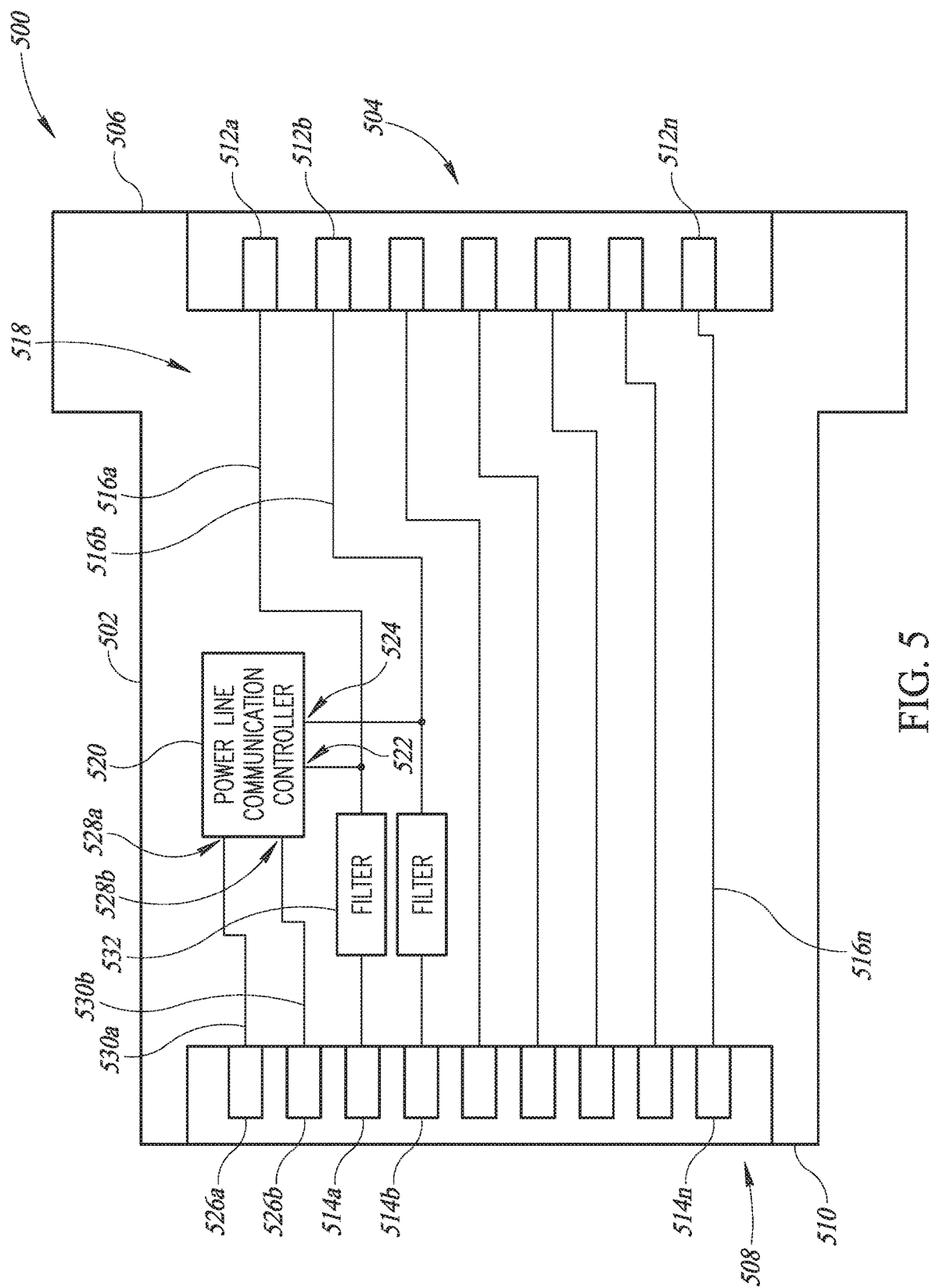
FIG. 5 is a cross-sectional view of the connector of FIG. 4 equipped with a powerline communication controller.

FIG. 5 shows a socket 500 for implementing powerline communications according to one or more embodiments. The socket 500 has a form factor corresponding to the socket 400 and is designed for installation on an exterior of the truck 102 and/or an exterior of the trailer 104 for establishing a connection between the electrical systems 302 and 304. The socket 500 has a body 502 provided with a first connector portion 504 provided on a first side 506 for connection of the plug 414 of the cable 402 described with respect to FIG. 4. The body 502 also includes a second connector portion 508 provided on a second side 510 opposite to the first side 506. The second connector portion 508 corresponds to the second connector portion 412 described with respect to FIG. 4.

The first connector portion 504 includes a plurality of first contacts 512a, 512b, . . . , 512n for engaging with corresponding contacts in the cable 402. The second connector portion 508 also includes a plurality of second contacts 514a, 514b, . . . , 514N for coupling with wires or cables connected to components of the electrical system 302 or the electrical system 304. The socket 500 includes an interior portion 518 containing a plurality of electrical lines 516a, 516b, . . . , 516N that extend between and electrically couple the plurality of first contacts 512a, 512b, . . . , 512N and the plurality of second contacts 514a, 514b, . . . , 514N. The socket 500 also includes a powerline communication controller 520 configured to introduce communications onto, and obtain communications from, power signals conveyed on the electrical lines 516.

The powerline communication controller 520 includes a first terminal 522 electrically coupled to the electrical line 516a and the second terminal 524 electrically coupled to the electrical line 516b. The electrical lines 516a and 516b are coupled to corresponding contacts 512a and 512b that are designated for conveying power signals to and/or from a corresponding electrical system coupled to the plurality of second contacts 514a, 514b, . . . , 514N of the second connector portion 508. For example, the contact 512a may be designated for conveying a power signal (e.g., +12 VDC) to the contact 514a, and the contact 514b may be designated for conveying a return signal (e.g., 0 VDC) back to the contact 512b. The powerline communication controller 520 is configured to introduce a first communication signal onto one of the electrical lines 516a and 516b, and obtain a second communication signal from the other one of the electrical lines 516a and 516b. The socket 500 also includes a set of ports 526a, 526b, etc. (collectively referred to as the set of ports 526) for connecting the powerline communication controller 520 with components in the tractor 102 or the trailer 104 on or in which the socket 500 is installed. For instance, for a socket 500 installed in the trailer 104, a sensor of the set of sensors 328 may be electrically communicatively coupled with the port 526a and a device of the set of devices 330 may be electrically communicatively coupled with the port 526b for sending signals to and receiving signals from the powerline communication controller 520 via the ports 526a and 526b. The set of ports 526 may be located in the second connector portion 508 on the rear side 510. The socket 500 is shown as including two ports 526a and 526b, but the number of ports provided in the socket 500 for connection of devices and/or sensors may be greater than two in other embodiments.

The powerline communication controller 520 includes a set of terminals 528a, 528b, etc., that are coupled with corresponding ports of the set of ports 526 via a set of electrical lines 530a, 530b, etc., therebetween. The set of ports 526 may include serial communication ports (e.g., universal serial bus ports), video ports (e.g., serial digital interface, video graphics array ports, high-definition multimedia interface ports), RJ-style ports (e.g., RJ-45, RJ-10), electrical contacts (e.g., for receiving sensor measurements), or other ports depending on the components involved. In some embodiments, the set of ports 526 may connect to a controller area network (CAN) bus and some or all of the connected devices may communicate according to one or more CAN bus protocols.

The socket 500 may include one or more filters 532 installed on the electric wires 516a and 516b for filtering electromagnetic interference (EMI). In some embodiments, the filters 532 may include low pass filters or band-stop filters that attenuate signals at frequencies introduced onto the electric wires 516a and 516b by the powerline communication controller 520. In some embodiments, the filters 532 may include one or more filters, such as an electromagnetic choke, for filtering transients that may interfere with communications by the powerline communication controllers 520, such as transients introduced as a result of switching on or off light-emitting diodes in the electrical system.

Figure 6:
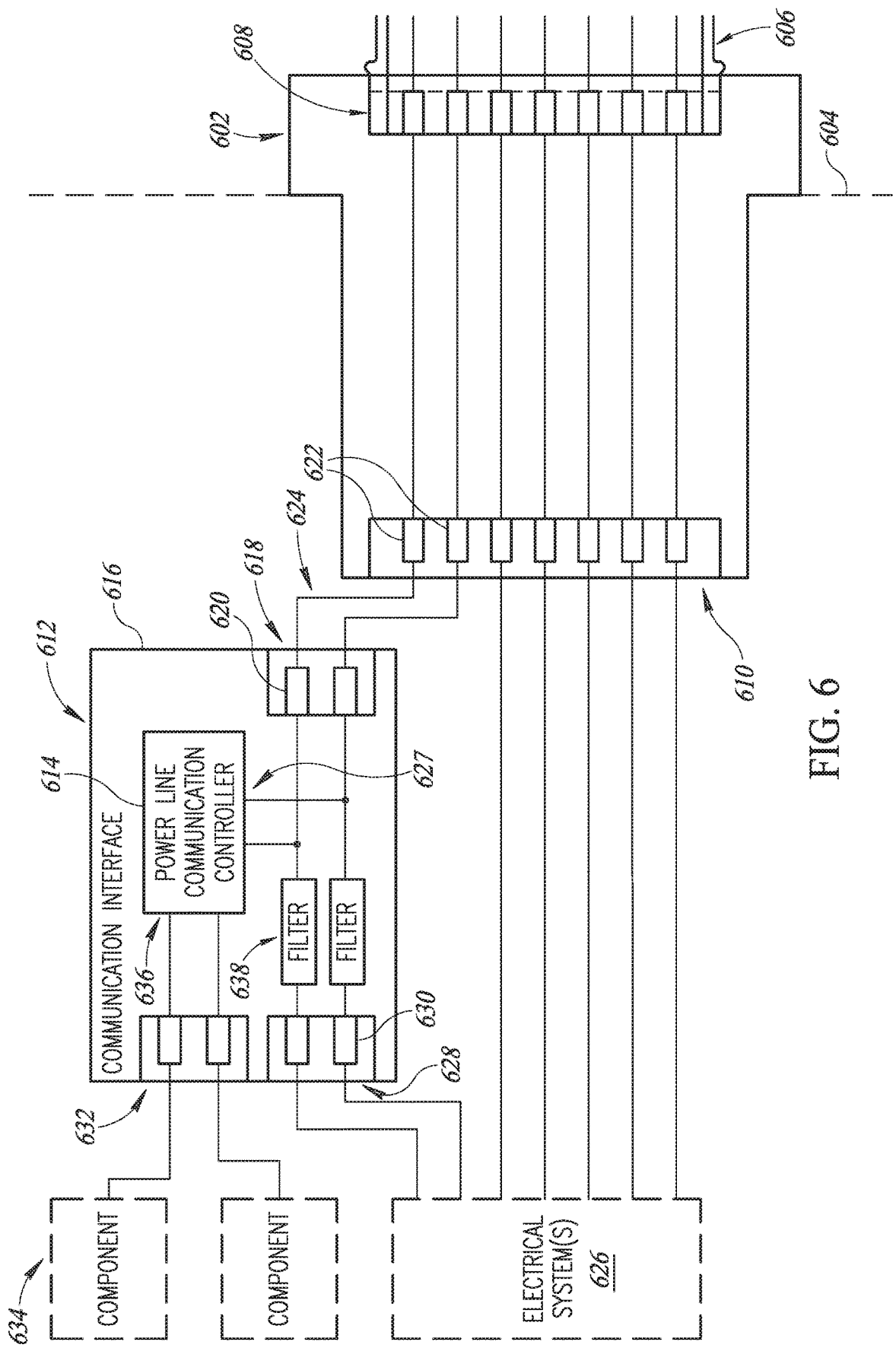
FIG. 6 is a communication interface for powerline communication coupled to the connector of FIG. 4.

In some embodiments, the powerline communication controller may be provided in a housing separate from the socket. FIG. 6 shows an system 600 in which a socket 602 is installed on an exterior surface 604 of the tractor 102 or the trailer 104. The socket 602 has a first connector portion 608 for engaging with a cable 606 to establish the connection 106 (see FIG. 1) between the tractor 102 and the trailer 104, and has a second rear connector portion 610 for connecting to the electrical system 302 or the electrical system 304 respectively of the tractor 102 or the trailer 104.

The system 600 comprises a communication interface module 612 that includes a powerline communication controller 614. The communication interface module 612 may be installed in the tractor 102 or on the trailer 104. The communication interface module 612 may comprise a housing or casing 616 made of a rugged material for protecting the powerline communication controller 614 from environmental conditions, as described elsewhere herein. The communication interface module 612 includes a first connector 618 with contacts 620 for connecting, via electrical lines 624, to contacts 622 of the second connector portion 610 that convey power signals to and/or from an electrical system 626 (corresponding to one of the electrical systems 302 and 304). The powerline communication controller 614 has a first set of terminals 627 for introducing communication signals onto and obtaining communication signals from the power signals on the electrical lines 624, as described above with respect to FIG. 5 and elsewhere herein.

The communication interface module 612 further includes a second connector portion 628 with a set of contacts 630 for conveying power signals to and/or from the electrical system 626. The communication interface module 612 may further include a third connector portion 632 for connecting to components 634 (e.g., devices, sensors, HMI, ECU) of the tractor 102 or trailer 104 in which the communication interface module 612 is installed. By way of non-limiting example, the third connector portion 632 may include one or more RJ receptacles (e.g., RJ-10 receptacles, RJ-45 receptacles), USB receptacles (e.g., USB-A, USB-B, USB-C), wire receptacles, RS-232 ports, D-miniature ports, or other receptacles or ports for receiving connectors according to desired communication protocols. The powerline communication controller 614 includes a second set of terminals 636 for communicating with the components 634 via the third connector portion 632. One or more filters 638 for filtering EMI may be installed on lines electrically coupling the set of first terminals 627 with the set of contacts 630, as described above with respect to the one or more filters 532.

Figure 7:
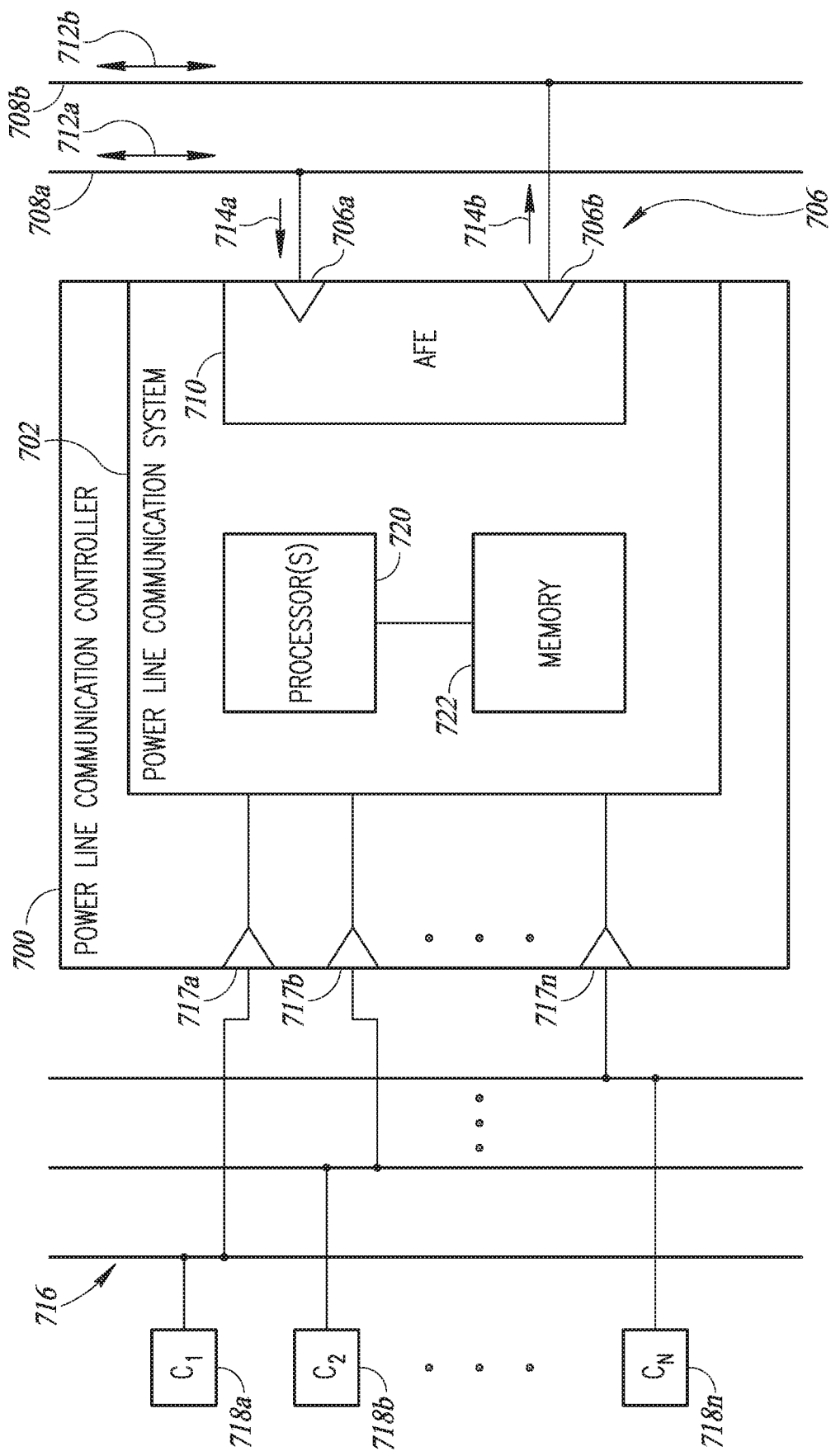
FIG. 7 is a schematic diagram of a powerline communication controller according to one or more embodiments.

FIG. 7 shows a schematic diagram of a powerline communication controller 700 according to one or more embodiments. The powerline communication controller 700 includes a powerline communication system 702 coupled to send and receive communications over the power signals on the electrical wires. The powerline communication controller 700 includes a set of terminals 706 for connecting to electrical wires conveying power signals, as described herein. The set of terminals 706 includes a first terminal 706a for coupling to a first electrical line 708a conveying a first power signal 712a and includes a second terminal 706b for coupling to a second electrical line 708b conveying a second power signal 712b. The powerline communication controller 700 is electrically coupled to a set of components 718a, 718b, . . . 718N of the tractor 102 or of the trailer 104.

The powerline communication system 702 includes one or more integrated circuits (ICs), an analog front-end 710 for sending and receiving communication signals on the power signals, a data link layer (not shown) for transferring data, and a physical layer (not shown) connecting the analog front-end 710 and the data link layer. The powerline communication system 702 may be implemented as a system-on-chip (SoC) or may be implemented as an IC module containing a set of ICs contained therein.

The analog front-end 710 may include a demodulator coupled to the first terminal 706a for demodulating a first communication signal 714a on the first power signal 712a. The demodulator may demodulate the communication signal according to a frequency shift keying (FSK technique) or a phase shift keying (PSK) technique. The analog front-end 710 may further include an analog-to-digital converter for converting the demodulated communication signal to a digital signal. The analog front-end 710 includes a modulator coupled to a second terminal 710b of the powerline communication system 702 for modulating a second communication signal 714b on the second power signal 712b. The analog front-end 710 may further include a digital-to-analog converter for converting a digital signal to an analog signal to be modulated via the second terminal 710b. In some embodiments, the first and second communication signals 714a and 714b may be respectively received and transmitted as Ethernet packets according to the Internet Protocol suite (aka Transmission Control Protocol/Internet Protocol (TCP/IP)).

The powerline communication controller includes a set of ports 717a, 717b, . . . , 717N that are coupled to a communication bus 716. The communication bus 716 communicatively couples the components 718a, 718b, . . . 718N to the powerline communication controller 700 for transmitting and receiving data or commands. For instance, for a powerline communication controller 700 installed in the trailer 104, the components 718a, 718b, . . . 718N may correspond to the sensors 328 and/or devices 330 described with respect to FIG. 3 and elsewhere. The powerline communication system 702 communicates with the components 718a, 718b, . . . 718N via the set of ports 717a, 717b, . . . , 717N according to one or more serial communication protocols, such as CAN protocols, USB protocols, Ethernet protocols, and/or FlexRay protocols, by way of non-limiting example. Each of the components 718a, 718b, . . . 718N may have a unique address assigned in the communication bus 716 such that each of the components 718a, 718b, . . . 718N is individually addressable by the powerline communication controller 700 to send and receive data or commands.

In some embodiments, the powerline communication controller 700 may include one or more processors 720 configured to process data received from the components 718a, 718b, . . . 718N or data received in the first communication signal 714a. A camera on the trailer 104, for example, may generate video data or image data that is transmitted over the communication bus 716 and received by the one or more processors 720. The one or more processors 720 may compress the video or image data into compressed data which is transmitted as the second communication signal 714b over the second power signal 712b.

The powerline communication controller 700 may encode information received from the components 718 before it is introduced as the communication signal 714b onto a power signal. Data received from one or more of the components 718, such as sensor data, may be encoded according to one or more communication protocols, such as serial communication protocols or TCP/IP protocols. Encoding may include packetizing the data into discrete packets that may include associated data or metadata regarding the data. For example, the information encoded by the powerline communication controller 700 may indicate a source of the data, such as a unique identifier or a CAN network address of the component 718 that generated the data. The information encoded by the powerline communication controller 700 may indicate time information associated with the data, such as a system time at which the data was generated or received.

The second communication signal 714b introduced by the powerline communication controller 700 may include information regarding a subject of the information, such as an indication of a sensor that generated the information (e.g., identifier of rear proximity sensor 108. The second communication signal 714b introduced by the powerline communication controller may include information regarding a target or destination of the data, such as an identifier of the HMI 326 or an or identifier or an address of a component to be controlled (e.g., camera motor, rear door motor 120). A corresponding powerline communication controller 700 receiving the encoded data may decode the data according to the one or more communication protocols—for example, to obtain the metadata associated.

The powerline communication controller 700 may compress the data received for transmission on the power signal. The powerline communication controller 700 may compress video and audio data captured by a camera or audio sensor according to one or more media compression algorithms. Non-limiting examples of video compression algorithms include MPEG-4, H.264, MPEG-4 AVC, and FFmpeg. Non-limiting examples of audio compression algorithms include Free Lossless Audio Codec (FLAC), MP3, Vorbis, and Advanced Audio Coding (AAC).

The powerline communication controller 700 may compress sensor data from one or more sensors according to one or more data compression techniques, such as, Run-length encoding (RLE), Huffman coding, Lempel-Ziv compression (e.g., LZ77, LZ78), and Bzip2, by way of non-limiting example. Compressed sensor data may include compression of data from one or more sensors taken over a period of time. A corresponding powerline communication controller 700 receiving the compressed data may decompress the data according to the one or more corresponding compression algorithms. Compression algorithms, as described herein, implement techniques and processes for changing or converting input data (e.g., from sensors, cameras) into a collection of data having fewer data bits than the input data. Such compression may be lossy or lossless depending on a desired quality and the available bandwidth.

The powerline communication controller 700 may encrypt data received for transmission on the power signal to improve data security and prevent unauthorized access to devices of the trailer 104 or the tractor 102. Encryption on the powerline communication controller 700 facilitates prevention of access to sensitive devices, such as the ECU 322 or the HMI 326, or access to the trailer door motor 120 or the refrigeration unit 128 to prevent theft or spoilage of goods in a compartment of the trailer 104. The powerline communication controller 700 may encrypt data according to cryptographic algorithms, either symmetric or asymmetric, in which a first powerline communication controller 700 encrypts the data to be transmitted via the power signal using a cryptographic key and a second powerline communication controller 700 decrypts the encrypted information using a corresponding cryptographic key.

Each powerline communication controller 700 may perform corresponding processes for successful, efficient, and/or secure transfer of data via the powerlines 712a and 712b. The powerline communication controller 700 of the tractor 102 may encode, encrypt, or compress data from the HMI 326, ECU 322, or other devices discussed herein, according to one or more processes discussed herein. For instance, the ECU 322 may provide signals indicating operations performed by the tractor 102 (e.g., turning, steering, speed, braking, acceleration, etc.), which may be encoded, encrypted, or compressed by the powerline communication controller 700 and introduced as a communication signal 714a on the first power signal 712a on the first powerline 708a.

The powerline communication controller 700 of the trailer 104 may receive the communication signal 714a and decode, decrypt, or decompress data obtained from the communication signal 714a (e.g., after it is demodulated) to appropriately control devices or obtain data from corresponding sensors or cameras. For instance, the powerline communication controller 700 of the trailer 104 may decode, decrypt, or decompress data from the communication signal 714a indicating that the tractor 102 is moving in reverse and turning toward the left. In response, the powerline communication controller 700 may send communications over the communication bus 716 instructing certain cameras of the trailer 104 to orient to view left and/or rear sides of the trailer 104 and begin sending image data.

Memory 722 included in the powerline communication controller 700 may be coupled to the one or more processors 720. The memory 722 may store instructions that, as a result of execution by the one or more processors 720, cause the one or more processors 720 to perform the operations described herein. The one or more processors 720 may be configured to evaluate whether one or more defined conditions are satisfied in connection with signals received from the set of sensors 328. The defined conditions may be stored as instructions in the memory 722. The one or more processors 720 determine whether the conditions detected in and around the defined regions of the trailer 104 satisfy one or more of the defined conditions.

As a result of determining that the signals from the sensors 328 satisfy a defined condition, the powerline communication controller 700 of the trailer 104 sends corresponding communication signals to a corresponding powerline communication controller of the tractor 102. For example, a set of radar or LiDAR sensors of the sensors 328 may transmit data over the communication bus 716 indicating the proximity of objects within regions in and around the trailer 104. The one or more processors 720 may process the proximity data to determine whether the proximity data satisfies one or more proximity conditions defined in instructions stored in the memory 722. The one or more proximity conditions may specify one or more proximity thresholds that, if exceeded, indicate a risk of collision with an object in one or more regions around the trailer 104. For instance, proximity conditions may specify distances for certain regions and, if an object is detected as being less than the distance in a corresponding region (e.g., less than 10 feet from the rear side 110 of the trailer 104), the one or more processors 720 may cause the powerline communication controller to introduce a communication on the powerline indicating satisfaction of the condition.

As a result of determining that the proximity data satisfies one or more of the proximity conditions, the one or more processors 720 may generate a communication signal (communication signal 714b) indicating the risk of collision with the object, and may specify a location of the object in one or more of the defined regions around the trailer 104. As described below, the communication signal 714b indicating the existence of one or more defined conditions in and around the trailer 104, may cause the corresponding powerline communication controller of the tractor 102 to present an indication of the condition on the HMI 326.

The one or more processors 720 may further be configured to (e.g., as a result of executing the set of instructions) cause devices of the trailer 104 to perform various operations in response to determining that the communication signals 714a specify certain information. The communication signal 714a, in some instances, may include instructions generated by the HMI 326, e.g., in response to receiving a user input, specifying one or more operations to be performed by one or more of the devices 330 of the trailer 104. As an example, the communication signal 714a may include instructions causing the one or more processors 720 to open or close the trailer door 122 or adjust a temperature output of the refrigeration unit 128. The communication signal 714a, in some instances, may include information generated by the ECU 322 that causes the one or more processors 720 to determine operations to be performed by one or more of the devices 330 of the trailer 104. The communication signal 714a may indicate that the tractor 102 is being steered in a certain direction or was shifted into reverse. In response, the one or more processors 720 may send instructions, via the communication bus 716, to a motor to adjust an orientation of the rear camera 116 to obtain image data of a region corresponding to the direction in which the trailer 104 is travelling in reverse. Thus, the powerline communication controller 700 can automatically control operation of the devices 330 and the sensor data obtained by the sensors 328 to facilitate safe and efficient operation of the tractor trailer 100.

The memory 722 may also store information regarding components coupled to the powerline communication controller 700 via the bus 716—for example, a powerline communication controller 700 of the trailer 104 may store information regarding the set of sensors 328 and/or the set of devices 330 (see FIG. 3).

Figure 8:
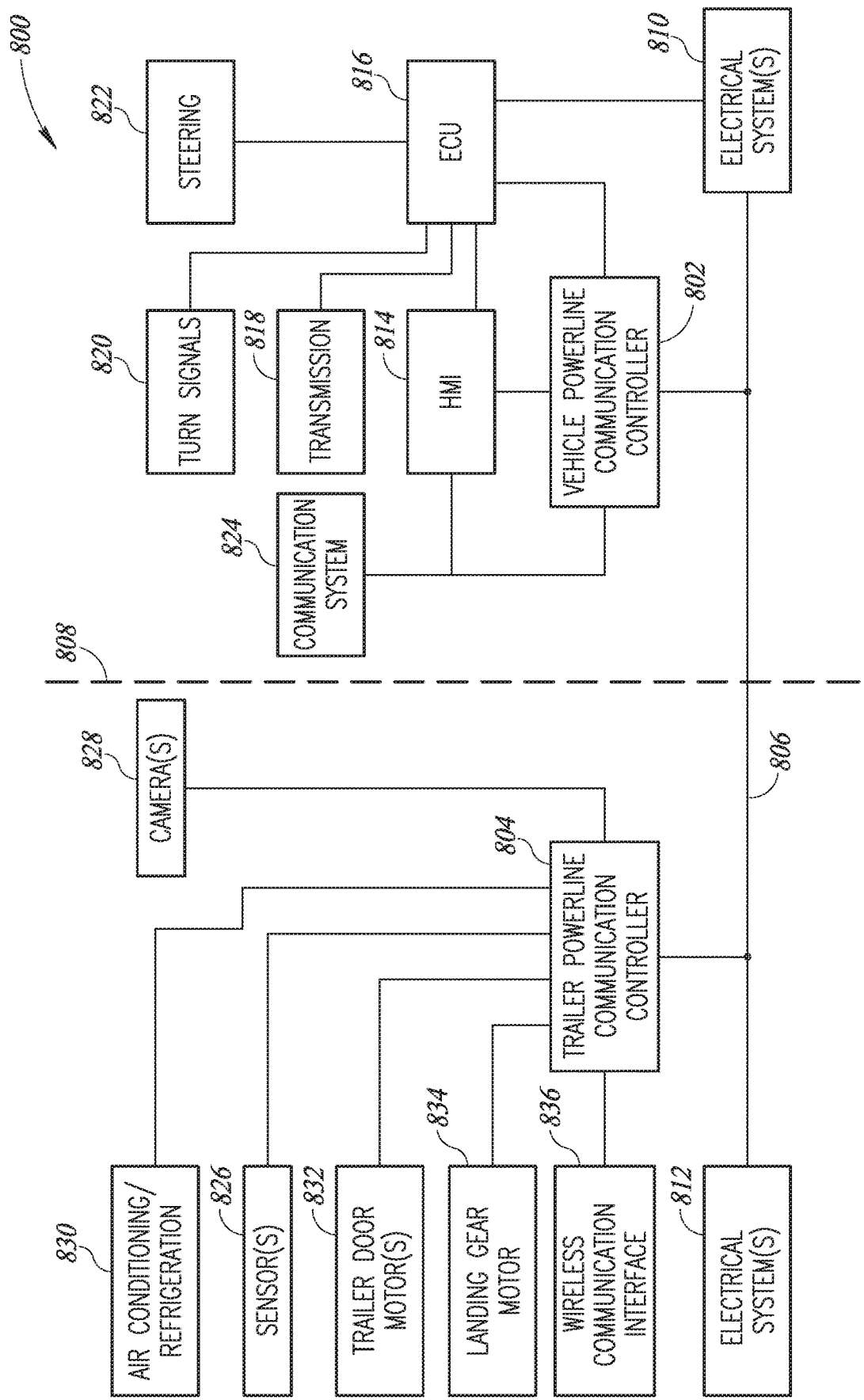
FIG. 8 is a schematic diagram of a system in which a powerline communication controller of a trailer is connected with a powerline communication controller of a vehicle.

FIG. 8 shows a schematic diagram of a system 800 in which a vehicle powerline communication controller 802 (e.g., of the tractor 102) is communicatively coupled with a trailer powerline communication controller 804 (i.e., of the trailer 104) over a set of powerlines 806 to facilitate operation of the tractor trailer 100. The set of powerlines 806 are coupled between the tractor 102 and the trailer 104 via a wired connection 808 corresponding to the connection 106 described herein. In response to establishment of the wired connection 808, the vehicle powerline communication controller 802 and the trailer powerline communication controller 804 may communicate to provide information regarding components of each respective system. For instance, the trailer powerline communication controller 804 may identify sensors and controllable devices on the trailer 104.

The electrical system 810 of the vehicle provides power to the electrical system 812 of the trailer via the set of powerlines 806. The vehicle powerline communication controller 802 and the trailer powerline communication controller 804 may communicate with each other via communication signals introduced onto the power signals on the set of powerlines 806 as described herein. The vehicle powerline communication controller 802 may introduce, e.g., via PSK circuitry or via FSK circuitry, communication signals onto the set of powerlines 806 based on instructions received from an HMI 814 of the vehicle and/or based on information received from an ECU 816 indicating operation of the vehicle.

The ECU 816 is coupled to various devices of the vehicle, such as a vehicle transmission 818, a turn signal switch 820, a steering system 822, and configured to receive information regarding a state or condition thereof. The ECU 816 may provide information to the vehicle powerline communication controller 802 based on the information received regarding operation of the vehicle devices. The HMI 814 includes or is connected to user input devices (e.g., touchscreen display) and provides instructions to the vehicle powerline communication controller 802 regarding operations to be performed by the devices of the trailer.

The vehicle may include a communication system 824 configured for wireless communication with external communication systems. The communication system 824 may, in some embodiments, communicate with communication systems of other tractor trailers to implement platooning, in which a plurality of vehicles wirelessly connect to and communicate with each other to facilitate coordinated vehicle driving and operation.

The vehicle powerline communication controller 802 may provide information to the HMI 814, the ECU 816, and/or the communication system 824 regarding conditions detected by a set of sensors on the trailer. For example, when operating in a platoon mode, the vehicle powerline communication controller 802 may receive communication signals from the trailer powerline communication controller 804 indicating the proximity of another vehicle operating in a platoon mode around the trailer based on measurements by the set of sensors 826. The vehicle powerline communication controller 802 may provide the proximity information to the other vehicle via the communication system 824 to maintain a safe distance between the vehicles.

The vehicle powerline communication controller 802 may be communicatively coupled to the communication system 824, the HMI 814, and/or the ECU 816 via one or more serial communication buses, which may include a CAN bus, a Universal Serial Bus, an Ethernet bus, or some combination thereof. In some embodiments, the vehicle powerline communication controller 802 may include one or more wireless communication interfaces. Such wireless communication interfaces may be separate from the communication system 824.

The trailer powerline communication controller 804 may introduce, e.g., via PSK circuitry or via FSK circuitry, communication signals onto the set of powerlines 806 based signals received from the devices and sensors connected thereto. The powerline communication controller 804 is coupled to the set of sensors 826 for receiving signals that indicate conditions detected by the set of sensors 826, at least some of which may correspond to the set of sensors 328 discussed with respect to FIG. 3. One or more processors of the powerline communication controller 804 may process the signals provided by the set of sensors 826, determine whether the signals satisfy one or more defined conditions, and generate communication signals to be introduced onto the set of powerlines 806 based on a result of the determination.

The trailer powerline communication controller 804 may also be electrically communicatively coupled to a set of cameras 828 via a communication bus for capturing image and/or video data providing a view of regions around the trailer. The one or more processors of the powerline communication controller 804 may process the image and/or video data for sending as a communication signal over the set of powerlines 806. For example, the trailer powerline communication controller 804 may compress the image or video data according to one or more compression algorithms (e.g., H.264, MPEG-4, MPEG-4 AVC) and transmit the compressed data as communication signals over the set of powerlines 806. In some embodiments, one or more processors of the trailer powerline communication controller 804 may analyze the video or image data to determine whether objects are present in the imaged regions around the trailer. The trailer powerline communication controller 804 may send communication signals to the vehicle powerline communication controller 802 as a result of identifying objects around the vehicle that present a risk of collision, for example.

The trailer powerline communication controller 804 is electrically communicatively coupled via the communication bus to one or more devices, which the trailer powerline communication controller 804 may control to perform various operations. The devices may, for instance, include an air conditioning or refrigeration unit 830 to which the trailer powerline communication controller 804 may transmit instructions to adjust a temperature output for controlling environmental conditions in a compartment within the trailer. The refrigeration unit 830 may include a temperature sensor from which the trailer powerline communication controller 804 obtains measurements regarding the temperature of the compartment.

The devices controllable by the trailer powerline communication controller 804 may include motors that the trailer powerline communication controller 804 may control aspects of the trailer. As a non-restrictive example, the trailer powerline communication controller 804 may be communicatively coupled with a controller of a trailer door motor 832 and/or communicatively coupled with a controller of a landing gear motor 834. The trailer powerline communication controller 804 may send control signals or instructions that cause the trailer door motor 832 to open or close the trailer door 122 (see FIG. 1). The trailer powerline communication controller 804 may also send control signals or instructions that cause the landing gear motor 834 to raise or lower the landing gear 126 (see FIG. 1).

The trailer may include one or more wireless device interfaces that facilitate wireless communications between the trailer powerline communication controller 804 and the devices. One or more wireless communication interfaces 836 may be communicatively coupled to the communication bus 716 described with respect to FIG. 7. The one or more wireless communication interfaces 836 may be configured to transmit and/or receive wireless signals associated with the devices and/or the set of sensors 826 of the trailer. The wireless communication interface 836 may include one or more wireless communication transceivers adapted for short to medium range wireless communication. Non-limiting examples of such wireless communication transceivers include Bluetooth transceivers, Wi-Fi transceivers, Zigbee transceivers, and the like. As an example, one or more remote sensors may be physically coupled to the trailer (e.g., not electrically coupled to the communication bus 716) and wirelessly coupled or "paired" with the wireless communication interface 836 according to corresponding communication protocols. The trailer powerline communication controller 804 may wirelessly obtain sensor readings from the remote sensors via the wireless communication interface 836.

The trailer powerline communication controller 804 may be communicatively coupled to the set of sensors 826, the set of cameras 828, the refrigeration unit 830, the trailer door motor 832, the landing gear motor 834, and the wireless communication interface 836 via a serial communication bus in some embodiments. Non-limiting examples of the serial communication bus include a CAN bus, a Universal Serial Bus, and a FlexRay bus.

In some embodiments, the vehicle powerline communication controller 802 and the trailer powerline communication controller 804 may communicate with each other over wired and wireless connections. Non-limiting examples of wireless connections include Wi-Fi (e.g., Wi-Fi Direct) and Bluetooth connections. The wireless communication interface 836 of the vehicle powerline communication controller 802 and a wireless communication interface of the trailer powerline communication controller 804 may establish wireless communications using the wired connection 808.

By way of non-limiting example, the powerline communication controllers 802 and 804 may perform a handshake according to a communication protocol (e.g., a serial communication protocol) to establish a communication session over the wired connection 808. Once the communication session is established, the vehicle powerline communication controller 802 may provide a cryptographic key to the trailer powerline communication controller 804 via the communication session, or vice versa. The trailer powerline communication controller 804 may then use the cryptographic key to establish a secure wireless communication session with the vehicle powerline communication controller 802. Other information relevant to establishing the secure wireless communication session may be exchanged via the communication session over the wired connection 808 in addition to the cryptographic key, such as key size, authentication protocol, and encryption type. In some embodiments, the trailer powerline communication controller 804 may instead provide the cryptographic key to the vehicle powerline communication controller 802, which uses the cryptographic key to establish the secure wireless communication session with the trailer powerline communication controller 804.

The vehicle powerline communication controller 802 and the trailer powerline communication controller 804 may exchange some data over the secure wireless communication session and exchange other data over the communication session over the wired connection 808. For example, sensor data may be provided over the communication session established using the wired connection 808, and video data may be provided over the secure wireless communication session established between wireless communication interfaces of the vehicle powerline communication controller 802 and the trailer powerline communication controller 804. In some implementations, the vehicle powerline communication controller 802 and the trailer powerline communication controller 804 may exchange all data over the secure wireless communication session, once established.

Figure 9:
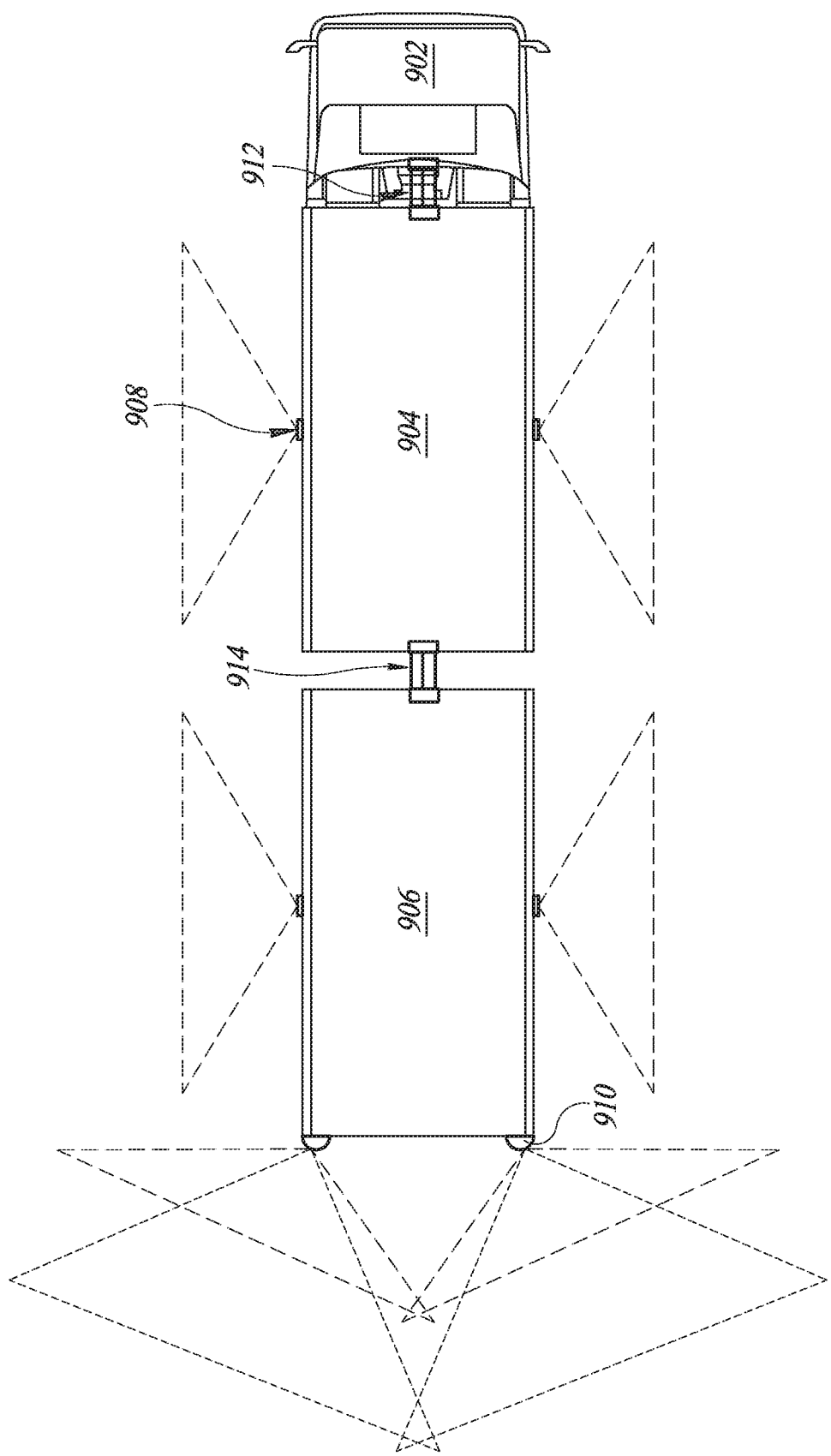
FIG. 9 is an overhead view of a tractor trailer in a multi-trailer configuration.

FIG. 9 shows an overhead view of a tractor multi-trailer configuration 900 in which a tractor 902 is towing a first trailer 904 and a second trailer 906. A vehicle powerline communication controller of the tractor 902 is communicatively coupled with a first trailer powerline communication controller of the first trailer 904 and a second trailer powerline communication controller of the second trailer 906 via a set of powerlines. The first trailer powerline communication controller is communicatively coupled to the vehicle trailer powerline communication controller via a first connection 912 between the first trailer 904 and the tractor 902. The second trailer powerline communication controller is communicatively coupled to the vehicle powerline communication controller via the first connection 912 and a second connection 914 between the first trailer 904 and the second trailer 906.

Each powerline communication controller may be independently addressable via communication signals provided in power signals on the set of powerlines. For example, the vehicle powerline communication controller of the tractor 902 may address communication signals to the first powerline communication controller of the first trailer 904 and address communication signals to the second trailer powerline communication controller of the second trailer 906.

Devices and sensors of the first trailer 904 and the second trailer 906 may also be addressable or identified as discussed elsewhere herein. According to serial communication protocols discussed herein (e.g., CAN bus protocol, USB protocol, FlexRay protocol), communication signals may include data specifying a source or destination of the data generated by sensors or instructions for controlling devices. For instance, communication signals regarding measurements by a sensor 908 on the first trailer 904 may include an identifier unique to the sensor 908.

Communication signals regarding video captured by a camera 910 on the second trailer 906 may include an identifier unique to the camera 910. Communication signals from a powerline communication controller of the vehicle 902 may include a unique identifier regarding an operation performed by the vehicle (e.g., left turn signal initiated, headlights turned on) that may cause the first and second trailer powerline communication controllers to control certain devices or obtain data from certain sensors/cameras. Communication signals from the powerline communication controller of the vehicle 902 may include a unique identifier regarding specific devices on the first trailer 904 and the second trailer 906 to be controlled, and include parameters indicating the operation to be performed by the specific devices. As a result, each device, sensor, component, etc. in the tractor multi-trailer configuration 900 is independently addressable in power signals via the powerline communication controllers described herein.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A communication interface for facilitating communications between a vehicle and a trailer via one or more powerlines, the communication interface comprising:
   a housing having a first contact and a second contact that are each accessible from an exterior of the housing;
   a first powerline that electrically couples the first contact and the second contact for conveying a first power signal between the vehicle and an electrical system;
   a device connector having a set of ports for connection to one or more devices of the trailer; and
   a powerline communication controller having a first terminal coupled to the first powerline and a second terminal coupled to the device connector, the powerline communication controller configured to:
      receive, via the device connector, a first signal from a device of the one or more devices that indicates a condition regarding a defined region of the trailer;
      generate, based on the first signal, a second signal representative of the condition; and
      introduce the second signal onto the first power signal; and
   a human-machine interface that facilitates manual control of at least one of the one or more devices of the trailer via the communication interface.

2. The communication interface of claim 1, wherein the housing includes a third contact and a fourth contact that are each accessible from the exterior of the housing, the communication interface further comprising:
a second powerline that electrically couples the third contact to the fourth contact for conveying a second power signal between the vehicle and the electrical system.

3. The communication interface of claim 2, further comprising:
a first receptacle that includes the first contact and the third contact, the first receptacle sized and shaped to receive a plug of a cable for coupling the electrical system to an electrical system of the vehicle.

4. The communication interface of claim 2, wherein the powerline communication controller is coupled to the second powerline and the powerline communication controller is configured to:
receive, via the third contact, a third signal on the second power signal, the third signal indicating an operation to be performed by a second device of the trailer; and
transmit, based on the third signal, a fourth signal representative of the operation to the second device via the device connector.

5. The communication interface of claim 4, wherein the powerline communication controller is configured to:
demodulate the third signal to obtain information provided by the vehicle that indicates the operation to be performed.

6. The communication interface of claim 2, wherein the powerline communication controller is coupled to the second powerline via the fourth contact and the powerline communication controller is configured to:
receive, via the fourth contact, a third signal;
process the third signal to determine that the vehicle performed a defined operation; and
Reply to Office Action Dated May 19, 2022 communicate with a second device of the trailer via the device connector based on the defined operation.

7. The communication interface of claim 1, wherein the powerline communication controller is configured to:
encode information provided in the first signal according to a compression algorithm, wherein the second signal is modulated on the first powerline to convey the information encoded.

8. The communication interface of claim 1, wherein the housing contains the powerline communication controller and the first powerline, the communication interface further comprising:
a first receptacle provided on a first side of the housing, the first receptacle including the first contact; and
a second receptacle provided on a second side of the housing opposite to the first side, the second receptacle including the second contact.

9. The communication interface of claim 8, wherein the housing is a trailer connector sized and shaped for installation on a front of the trailer.

10. A system for facilitating powerline communications between a vehicle and a trailer, the system comprising:
a set of sensors coupled to the trailer and configured to provide signals indicating conditions regarding a set of defined regions of the trailer;
a housing physically coupled to the trailer;
a first set of contacts accessible from an exterior of the housing;
a second set of contacts accessible from the exterior of the housing;
a set of powerlines coupled between the first set of contacts and the second set of contacts; and
a powerline communication controller contained in the housing, the powerline communication controller electrically coupled to the set of powerlines, communicatively coupled to the set of sensors, and configured to:
receive a first signal indicating a condition detected by a sensor of the set of sensors in a defined region;
generate, based on the first signal, a second signal representative of the condition detected; and
introduce the second signal onto a first powerline signal in a first powerline of the set of powerlines; and
a human-machine interface that facilitates manual control of at least one of the one or more devices of the trailer.

11. The system of claim 10, wherein the housing is a trailer connector installed on a front of the trailer, the first set of contacts are included in a first connector accessible on the front of the trailer, the second set of contacts are included in a second connector located on a side of the housing opposite to the first connector, and the second set of contacts are electrically coupled to an electrical system of the trailer.

12. The system of claim 10, wherein the first set of contacts are electrically coupled to a trailer connector installed on a front of the trailer, and the second set of contacts are electrically coupled to an electrical system of the trailer.

13. The system of claim 10, wherein the powerline communication controller is configured to:
receive a second power signal in a second powerline of the set of powerlines;
obtain a third signal from the second power signal; and
determine, based on the third signal, that the vehicle performed a defined operation, wherein the second signal is generated as a result of determining that the vehicle performed the defined operation.

14. The system of claim 13, wherein the powerline communication controller is configured to:
demodulate the third signal to obtain vehicle information provided from the vehicle that indicates the defined operation performed.

15. The system of claim 10, wherein the set of sensors includes a proximity sensor positioned to detect an object in a first defined region of the set of defined regions of the trailer, the first signal indicates proximity of the object in the first defined region, and the second signal is generated as a result of the proximity of the object exceeding a defined proximity threshold.

16. The system of claim 10, wherein the set of sensors includes a camera positioned to capture images of a first defined region of the set of defined regions, the first signal includes one or more images captured of the first defined region, and the second signal is a compressed image signal corresponding to the one or more images captured.

17. The system of claim 10, further comprising:
a set of devices coupled to the trailer and configured to perform operations involving the trailer, the powerline communication controller configured to:
receive a second power signal in a second powerline of the set of powerlines;
obtain a third signal from the second power signal; and
transmit a fourth signal to a device of the set of devices based on the third signal, the fourth signal specifying an operation to be performed by the device.

18. The system of claim 10, wherein the system includes a device interface coupled to a serial communication bus, wherein the powerline communication controller receives the first signal via the serial communication bus according to a serial communication protocol.

19. A method, comprising:
receiving a first power signal via a first terminal coupled to a first powerline and a second power signal via a second terminal coupled to a second powerline, the first powerline and the second powerline electrically coupling a first electrical system of a vehicle of a vehicle trailer assembly and a second electrical system of a trailer of the vehicle trailer assembly;
receiving, via a first port of a device interface, a first signal indicating a condition detected by a sensor positioned on the trailer;
generating, based on the first signal, a second signal representative of the condition detected;
introducing the second signal onto the first power signal via the first terminal;
receiving a third signal on the second power signal via the second terminal, the third signal indicating an operation to be performed by a first device positioned on the trailer; and
transmitting, based on the third signal, a fourth signal representative of the operation to the first device via a second port of the device interface.

20. The method of claim 19, comprising:
receiving, via the second terminal, a fifth signal on the second power signal via the second terminal;
determining, based on the fifth signal, that the vehicle performed an operation defined in memory; and
transmitting, based on the operation defined in memory, a communication specifying an operation to be performed by a second device of the trailer via the device interface.

* * * * *

UNITED STATES PATENT AND TRADEMARK OFFICE
CERTIFICATE OF CORRECTION

| | |
|---|---|
| PATENT NO. | : 11,618,291 B2 |
| APPLICATION NO. | : 16/773762 |
| DATED | : April 4, 2023 |
| INVENTOR(S) | : Christopher S. Balton et al. |

It is certified that error appears in the above-identified patent and that said Letters Patent is hereby corrected as shown below:

In the Claims

Column 21, Claim 6, Lines 35-36:
"Reply to Office Action dated May 19, 2022 communicate with a second device"
Should read:
--communicate with a second device--.

Signed and Sealed this
Twenty-eighth Day of May, 2024

Katherine Kelly Vidal
*Director of the United States Patent and Trademark Office*